(12) United States Patent
Kallunki et al.

(10) Patent No.: US 9,997,945 B2
(45) Date of Patent: Jun. 12, 2018

(54) CHARGEABLE DEVICE AND CHARGER THEREOF

(71) Applicant: Oura Health Oy, Oulu (FI)

(72) Inventors: Markku Kallunki, Oulu (FI); Markku Koskela, Oulu (FI)

(73) Assignee: Oura Health Oy, Oulu (FI)

( * ) Notice: Subject to any disclaimer, the term of this patent is extended or adjusted under 35 U.S.C. 154(b) by 248 days.

(21) Appl. No.: 14/953,739

(22) Filed: Nov. 30, 2015

(65) Prior Publication Data

US 2017/0155252 A1 Jun. 1, 2017

(51) Int. Cl.
H02J 7/00 (2006.01)

(52) U.S. Cl.
CPC ............ H02J 7/007 (2013.01); H02J 7/0036 (2013.01); *H02J 2007/0096* (2013.01)

(58) Field of Classification Search
CPC .................................................. H02J 7/007
USPC ......................................................... 320/107
See application file for complete search history.

(56) References Cited

U.S. PATENT DOCUMENTS

| | | | | |
|---|---|---|---|---|
| 4,418,310 A * | 11/1983 | Bollinger | ............... | H02J 7/0081 320/149 |
| 5,317,249 A * | 5/1994 | Ford | ...................... | H02J 7/0068 320/160 |
| 5,422,560 A * | 6/1995 | Yan | ....................... | H02J 7/0091 320/160 |
| 5,477,124 A * | 12/1995 | Tamai | ................... | H01M 10/44 320/135 |
| 2007/0257635 A1* | 11/2007 | Yang | ...................... | H02J 7/0031 320/107 |
| 2008/0094038 A1* | 4/2008 | Okada | ................... | H02J 7/0072 320/163 |
| 2009/0027011 A1* | 1/2009 | Umetsu | ................. | H02J 7/0044 320/145 |
| 2010/0195355 A1* | 8/2010 | Zheng | ............... | H02M 3/33507 363/21.12 |
| 2010/0315044 A1* | 12/2010 | Sunderlin | ........... | H01M 10/425 320/136 |
| 2012/0112686 A1* | 5/2012 | Zhang | ................... | H02J 7/0021 320/107 |
| 2014/0100468 A1* | 4/2014 | Yu | ...................... | A61B 5/02444 600/513 |
| 2015/0212135 A1* | 7/2015 | Jin | ....................... | B60L 11/1809 324/538 |
| 2017/0025877 A1* | 1/2017 | Xintian | ................. | H02J 7/0068 |

* cited by examiner

*Primary Examiner* — Suresh Memula

(74) *Attorney, Agent, or Firm* — Ziegler IP Law Group, LLC

(57) ABSTRACT

Disclosed is a chargeable device having a processing circuitry configured to detect a voltage level at a first point of the processing circuitry. The first point is electrically coupled via a first resistor to a source of measurement signal and via a diode to a second point. The second point being electrically coupled via a second resistor to a first charger contact of the chargeable device and via a third resistor to a second charger contact of the chargeable device. The processing circuitry is configured to determine, from the voltage level detected at the first point, whether or not the first charger contact and the second charger contact of the chargeable device are electrically connected to a charger and whether or not the charger is energized.

16 Claims, 6 Drawing Sheets

CHARGEABLE DEVICE AND CHARGER THEREOF

TECHNICAL FIELD

The present disclosure relates generally to a battery operated systems; and more specifically, to a system having a chargeable device and a charger for the chargeable device.

BACKGROUND

In today's world the use of a battery operated systems can be found in almost every aspects of human life. One such example includes use of personal health monitoring devices, which may be a battery operated system. Typically, such personal health monitoring devices include a primary device (such as a chargeable device capable of operating for monitoring user's health) and a charger for the chargeable device. Generally, such health monitoring devices (i.e. chargeable devices) are packed in sales packages for being offered in a market for sale. Usually, a time taken between the packaging of such chargeable devices (in a manufacturing unit) and being sold (in the market) may vary from few weeks to a year or even more. This may lead to a situation where the chargeable device may exhaust its electrical battery power before even getting sold. Therefore, the chargeable device may stop functioning, due to a totally drained battery, before even getting sold.

In order to address above problem, various battery power retaining methods have been used with such chargeable devices. One way to address the battery drainage problem is to have a plastic tag between the battery and electronic components of the chargeable devices, such that when the tag is removed the electronic components start receiving electrical power from the battery. Another way to address the battery drainage problem is to have an external button for turning ON and OFF the chargeable device. However, recent (or latest) personal health monitoring devices (i.e. the chargeable devices) includes a battery that is integrally arranged within a body of the chargeable device. Specifically, such chargeable devices lack a cover which makes the battery non-accessible, and lack external button for turning ON and OFF the chargeable devices. Therefore, the problem of retaining battery power (or battery drainage) still remains unsolved when read in conjunction with above listed conventional solutions. Another problem is that the chargeable device may sometimes be stored in the charger. Thus, due to the status of the charger, it would be necessary to know whether the charger is powered or not, in order to set the chargeable device in an appropriate operation mode, such as to charge the device or to save power.

Therefore, in light of the foregoing discussion, there exists a need to overcome the aforementioned drawbacks of retaining battery power for the conventional chargeable devices.

SUMMARY

The present disclosure seeks to provide a chargeable device.

The present disclosure also seeks to provide a method for use with a chargeable device.

In one aspect, an embodiment of the present disclosure provides a chargeable device comprising:
a processing circuitry configured to detect a voltage level at a first point (P1), the first point (P1) being electrically coupled via a first resistor (R1) to a source of measurement signal and via a diode to a second point (P2), the second point (P2) being electrically coupled via a second resistor (R2) to a first charger contact (X1) of the chargeable device and via a third resistor (R3) to a second charger contact (X2) of the chargeable device,
wherein the processing circuitry is configured to determine, from the voltage level detected at the first point (P1), whether or not the first charger contact (X1) and the second charger contact (X2) of the chargeable device are electrically connected to a charger and whether or not the charger is energized.

In another aspect, an embodiment of the present disclosure provides a method for use with a chargeable device, the method comprising:
detecting a voltage level at a first point (P1), the first point (P1) being electrically coupled via a first resistor (R1) to a source of measurement signal and via a diode to a second point (P2), the second point (P1) being electrically coupled via a second resistor (R2) to a first charger contact (X1) of the chargeable device and via a third resistor (R3) to a second charger contact (X2) of the chargeable device; and
determining, from the voltage level detected at the first point (P1), whether or not the first charger contact (X1) and the second charger contact (X2) of the chargeable device are electrically connected to a charger and whether or not the charger is energized.

The present disclosure also relates to a charger for use with a chargeable device according to this description, the charger comprising
a first contact (Y1) for electrically coupling to the first charger contact (X1) of the chargeable device;
a second contact (Y2) for electrically coupling to the second charger contact (X2) of the chargeable device; and
a fourth resistor (R4) electrically coupled to the first contact (Y1) and to the second contact (Y2)

Embodiments of the present disclosure substantially eliminate or at least partially address the aforementioned problems in the prior art, and provides an efficient way of using and/or retaining battery power of chargeable devices.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1A:
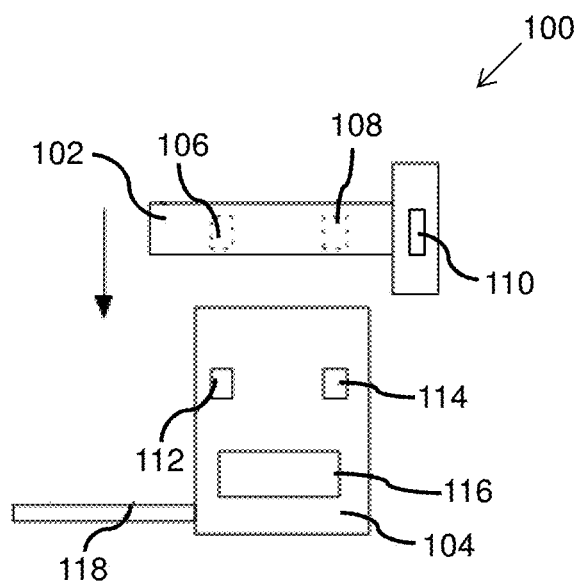
FIGS. 1A-B are schematic illustrations of a system having a chargeable device and a charger, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the present disclosure provided herein, one of ordinary skill in the art will appreciate a variety of ways in which connection or coupling exists in accordance with the aforementioned definition.

The phrases "in an embodiment", "in accordance with an embodiment" and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

If the specification states a component or feature "may", "can", "could", or "might" be included or have a characteristic, that particular component or feature is not required to be included or have the characteristic.

In one aspect, an embodiment of the present disclosure provides a chargeable device comprising:
a processing circuitry configured to detect a voltage level at a first point, the first point being electrically coupled via a first resistor to a source of measurement signal and via a diode to a second point, the second point being electrically coupled via a second resistor to a first charger contact of the chargeable device and via a third resistor to a second charger contact of the chargeable device,
wherein the processing circuitry is configured to determine, from the voltage level detected at the first point, whether or not the first charger contact and the second charger contact of the chargeable device are electrically connected to a charger and whether or not the charger is energized.

In another aspect, an embodiment of the present disclosure provides a method for use with a chargeable device, the method comprising:
detecting a voltage level at a first point, the first point being electrically coupled via a first resistor to a source of measurement signal and via a diode to a second point, the second point being electrically coupled via a second resistor to a first charger contact of the chargeable device and via a third resistor to a second charger contact of the chargeable device; and
determining, from the voltage level detected at the first point, whether or not the first charger contact and the second charger contact of the chargeable device are electrically connected to a charger and whether or not the charger is energized.

According to an embodiment, the present disclosure is associated with a system, particularly a battery operated system, having a chargeable device and a charger. The chargeable device is configured to be operatively (i.e. electrically) coupled to the charger for being charged with an electrical power source. For example, the chargeable device may be electrically charged using the charger with the help of a household electrical supply (i.e. the electrical power source), for example 100 to 230 volts, as the charger is coupled to the mains. The charging supply to the chargeable device can vary for example from 4 to 12 V, depending on the chargeable battery. Typically, the charging supply is 5 V in case of a small chargeable battery used in a wearable device such as a ring. In an example, the chargeable device may be inserted into (or received by) the charger for operatively coupling the chargeable device and the charger. Further, both the chargeable device and the charger include electrical connector pads configured to connect with each other during charging.

In one embodiment, the chargeable device may be an electronic device having an electrical energy source, such as a battery, configured therein. Specifically, the battery is integrally arranged within a body of the chargeable device. For example, the body of the chargeable device may not include a cover, which makes the battery non-accessible. The body of the device may also include a non-openable cover, i.e. the battery may not be changeable or available to be replaced or changed. Also, the chargeable device lacks an external button for turning ON and OFF the chargeable device. Therefore, the battery of the chargeable device is always in an operating state, i.e. providing at least a minimum amount of required electrical energy for the operation of the chargeable device. The battery of the chargeable device starts operating from the time of installation (i.e. during the manufacturing stage), and remains operational till the chargeable device gets sold for being used by a user. The chargeable device of the present disclosure is configured to have multiple operational modes and configured to drawn required electrical energy corresponding to such multiple operational modes, which allows efficient utilization of electrical energy of the battery, explained in greater detail herein later.

In an embodiment, the chargeable device is a wearable electronic device configured to measure user's physiological data. For example, the wearable electronic device may be configured to measure user's movements and a heart rate. The chargeable device may be a ring configured to be suitably worn at a finger, such as an index finger. Alternatively, the chargeable device may be a device adapted to be worn at wrist, chest and any suitable body part of the user, from where physiological data of the user can be measured. According to an embodiment, the chargeable device is as described in PCT/FI2014/000043, which application is hereby incorporated by reference.

In an embodiment, the chargeable device comprises at least one sensor for collecting sensor data associated with the user. For example, the at least one sensor is selected from the group consisting of motion sensors, optical sensors and temperature sensors, capable of measuring various users' parameters.

According to an embodiment, the chargeable device also includes other electronic components configured to control, collect and analyse the sensor data. For example, the wearable electronic device may include other electronic components which may include but not limited to a microcontroller operable to control operation of the sensors for generating data related to the user's movement, heart rate, temperatures, ambient light and the like. The chargeable device may also include other electronic components, such as a microprocessor operable to at least partially process or analyse data generated by the sensors, and a memory for storing such analysed or processed data.

In one embodiment, the chargeable device also comprises a communication interface for communicating the collected sensor data to an external device. The communication interface enables in establishing a communication between the chargeable device and the external device for sharing the collected sensor data there-between. For example, the external device may be wirelessly connected to the chargeable device by the communication interface, such as a Wi-Fi, Bluetooth and the like, for collecting the sensor data from the chargeable device. In an example, the external device may comprise a computing device, which includes but not limited to a smart phone, a tablet computer, a phablet and a laptop. In an embodiment, the external device enables in at least partially process or analyse the collected sensor data to determine user's physiological data.

According to an embodiment, the chargeable device of the present disclosure is configured have various operational modes based on electrical connection between the chargeable device and the charger, and whether or not the charger is capable to charge a chargeable device, i.e. has charging voltage connected to the charging pads or connectors. Typically this means that the charger is coupled to the mains, but the charger may also have its own battery. In an embodiment, the operational modes of the chargeable device may be associated with different voltage levels available at various electrical locations of the chargeable device.

In an example, the chargeable device comprises a processing circuitry configured to detect a voltage level at a first point thereof, for example an electrical location associated with the chargeable device. In an embodiment, the processing circuitry includes electrical components, such as resistor and diode, configured (or operatively arranged) in a manner to detect voltage levels at various electrical locations (such as the first point) of the chargeable device. For example, the processing circuitry includes a first resistor, a second resistor, a third resistor and a diode. Further, the first point is electrically coupled via the diode to a second point of the processing circuitry. The second point is electrically coupled via the second resistor to a first charger contact (such as a charging pad) of the chargeable device and via the third resistor to a second charger contact (such as another charging pad) of the chargeable device.

In an embodiment, the first point is also electrically coupled via the first resistor to the source of measurement signal. The term "source of measurement signal" used herein may be associated with the microcontroller, which is in operation configured to provide a measurement signal, for example a 3 volts measurement signal to the processing circuitry (particularly, the first point thereof). The processing circuitry (particularly, the first point thereof) is also electrically coupled to another electrical point, a source of detected signal, associated with the microcontroller to provide a detected signal. It may be evident that the detected signal may be based on the measurement signal provided by the source of measurement signal. In simple words, the microcontroller is electrically connected to the processing circuitry (particularly, the first point thereof) with the help of two electrical points, one point (i.e. the source of measurement signal) for providing the measurement signal and another point (source of detected signal) for providing the detected signal (corresponding to the measurement signal).

In an example, the first point is also electrically coupled to a supplementary resistor (fifth resistor R5). The resistor R5 may be used as a coupling circuitry with resistor R1. It forms a voltage dividing function and also limits the current consumption of the processing circuitry (see for example reference 228 in FIG. 2). The resistance of the resistor R5 is typically selected to be higher than the resistance of the resistor R1, for example its resistance is 100 to 500 times the resistance of R1. Therefore, its effect on the voltage level to be measured and detected is minimal and can be neglected.

According to an embodiment, the charger of the present disclosure comprises a first contact (i.e. a charging pad) for electrically coupling to the first charger contact of the chargeable device. The charger also comprises a second contact (i.e. a charging pad) for electrically coupling to the second charger contact of the chargeable device. The charger further comprises a fourth resistor electrically coupled to the first contact and to the second contact of the charger. The charger also includes a charger circuit for regulating (or transforming) electrical power of the electrical power source (i.e. household electrical power supply of about 100 to 230 volts) for being suitably applied on the chargeable device for charging the battery of the chargeable device. In an example, the charger circuit of the charger may enable the household electrical power supply (of about 100 to 230 volts) to be 5 volts for being suitably used by the chargeable device for charging the battery thereof.

In one embodiment, the chargeable device also comprises a charging circuit electrically coupled to the processing circuitry. The charging circuit of the chargeable device is also further electrically coupled to the battery. The charging circuit may enable in providing and maintaining adequate voltage levels required for effectively charging the battery of the chargeable device. In an example, the charging circuit of the chargeable device may enable in providing and maintaining electrical power of 5 volts for effectively charging the battery of the chargeable device.

According to an embodiment, in operation, the measurement signal (i.e. 3 volts measurement signal) provided by the microcontroller causes change in the voltage level of the first point of the processing circuitry based on the electrical connection between the chargeable device and the charger, and whether or not the charger is energized. Therefore, the processing circuitry of the chargeable device is also configured to determine, from the voltage level detected at the first point, whether or not the first charger contact and the second charger contact of the chargeable device are electrically connected to a charger, and whether or not the charger is energized. In an example, the processor of the chargeable device may enable in determining the voltage level at the first point corresponding to the measurement signal provided by the microcontroller.

In an embodiment, the chargeable device and the charger of the present disclosure are configured to have electrical configuration (or arrangement), which enables in applying the measurement signal and measuring the detected signal (corresponding to the measurement signal). For example, the first resistor, the second resistor and the third resistor of the processing circuitry of the chargeable device may be arranged to have resistance values in a manner that the voltage level detected at the first point of the processing circuitry may have definite voltage level values corresponding to the electrical connection between the chargeable device and the charger, and whether or not the charger is energized. Additionally, the resistance value of the fourth resistor of the charger, the fifth resistor of the processing circuitry and the diode are also taken in consideration for having (or yielding) definite voltage level values corresponding to the electrical connection between the chargeable device and the charger, and whether or not the charger is energized.

In one embodiment, resistance values for resistors may be based on a resistance value of the first resistor. For example, the first resistor may have a resistance value of about 500 to 10000 ohms. Further, the second resistor may have a resistance value of about 0.1 to 0.3 times of the resistance value of the first resistor. Furthermore, the third resistor may have a resistance value of about 1.5 to 3 times of the resistance value of the first resistor. Moreover, the fourth resistor may have a resistance value of about 1.5 to 3 times of the resistance value of the third resistor. In an example, the first resistor, the second resistor, the third resistor and the fourth resistor may have resistance values of 1000 ohms, 120 ohms, 2200 ohms and 4700 ohms, respectively. Also, the fifth resistor may have a resistance value of 200-800 k ohms, for example 330 k ohms. Additionally, the diode may be a CDBZ0130R-HF diode having a voltage drop there-across of about 0.25 V.

According to an embodiment, the voltage level detected at the first point may be substantially equal to a first voltage level value, for example 3 volts (explained in detail in conjunction with FIG. 5), when the charger is electrically connected to the first charger contact and to the second charger contact of the chargeable device, and the charger is energized. It may be evident that in this case, the first voltage level value of 3 volts corresponds to the electrical values of the first, second, third, fourth and fifth resistors, and the diode. Further, the voltage level detected at the first point may be substantially equal to a second voltage level value, for example 1.9 volts (explained in detail in conjunction with FIG. 6), when the charger is electrically connected to the first charger contact and to the second charger contact of the chargeable device, and the charger is un-energized. Moreover, the voltage level detected at the first point may be substantially equal to a third voltage level value for example 2.1 volts (explained in detail in conjunction with FIG. 7), when the charger is electrically unconnected to the first charger contact and/or the second charger contact of the chargeable device.

In an embodiment, as mentioned above, the chargeable device of the present disclosure may be configured to have multiple operational modes for efficiently utilizing the electrical energy of the battery. Specifically, the processing circuitry may be configured to select a mode of operation of the chargeable device, based upon the voltage level detected at the first point. For example, the mode of operation of the chargeable device may be selected from the group consisting of a charging mode of operation (e.g. when the detected voltage level at the first point is 3 volts), wherein the device is in the charger and the charger is energized. Further, the mode of operation of the chargeable device may be a deep power saving mode of operation (e.g. when the detected voltage level at the first point is 1.9 volts), wherein the device is in the charger and the charger is un-energized. Moreover, the mode of operation of the chargeable device may be an active mode of operation (e.g. when the detected voltage level at the first point is 2.1 volts), wherein the device is absent from the charger.

According to an embodiment, the processing circuitry may be configured to energize the communication interface of the chargeable device when the chargeable device is in the charging mode of operation. In other words, when a user is normally charging the chargeable device with the help of the charger, the communication interface is energized to communicate with the external device (such as the smart phone) for transmitting the collected sensor data of the chargeable device to the external device. This may allow the external device to at least partially process or analyse the collected sensor data to determine user's physiological data. Further, in such instance (i.e. in the charging mode of operation), the at least one sensor of the chargeable device may be de-energized, as the chargeable device is not in contact with the user body and the at least one sensor is not required to work accordingly.

In another embodiment, the processing circuitry may be configured to de-energize the at least one sensor and the communication interface when the chargeable device is in the deep power saving mode of operation. In other words, when the chargeable device is not in use, for example, when the chargeable device is packed in a sale package for selling after manufacturing. Alternatively, when the chargeable device is merely electrically connected to the charger and the charger is not energized. In such situation, the function (or operation) of both the at least one sensor and the communication interface may not be required, and therefore the processing circuitry may de-energize both the at least one sensor and the communication interface for efficiently utilizing the electrical energy of the battery. Therefore, the deep power saving mode of operation allows in saving battery power for longer battery life, and avoids unnecessary function of the chargeable device (i.e. the sensor and the communication interface thereof).

In yet another embodiment, the processing circuitry may be configured to energize the at least one sensor and the communication interface when the chargeable device is in the active mode of operation. It may be evident that the chargeable device may be in the active mode of operation (or in use), when the charger is electrically unconnected to the first charger contact and the second charger contact of the chargeable device. In other words, when the chargeable device is in use, i.e. when the chargeable device is used for monitoring user's physiological parameters, the function (or operation) of the at least one sensor is essentially required. Therefore, the processing circuitry energizes the at least one sensor for allowing the at least one sensor to operate for measuring the data associated with the physiological parameters. Further, in such instance, the processing circuitry may be also configured to energize the communication interface for allowing transmission of the collected sensor data of the chargeable device to the external device. For example, the processing circuitry may energize the communication interface after a pre-determined time period for transmitting the sensor data collected over the pre-determined time period to the external device. Otherwise, the processing circuitry may energize the communication interface for transmitting the collected sensor data in real time. In another embodiment, the processing circuitry may be configured to energize the at least one sensor when the chargeable device is in the charging mode of operation.

According to an embodiment, the processing circuitry may be also configured to detect the voltage level at the first point on a periodic basis. More specifically, the processing circuitry is configured to periodically check the voltage level at the first point for allowing the chargeable device to work according to the change in the voltage level (i.e. to attain one of the charging mode of operation, the deep power saving mode of operation and the active mode of operation based on the change in the voltage level at the first point). In an example, the processing circuitry is configured to check periodically whether the charger is still electrically connected to the first charger contact and to the second charger contact of the chargeable device and the charger is un-energized, i.e. when the chargeable device is in the deep power saving mode of operation. Specifically, in the deep power saving mode (i.e. when the chargeable device is packed in the sale package) the chargeable device is not required to work primarily, however, when the chargeable device is worn by the user for use (after purchase) the chargeable device should change from the deep power saving mode of operation to the active mode of operation. Further, during charging, the chargeable device should change from the active mode of operation to the charging mode of operation.

In one embodiment, the charger is electrically unconnected to the first and second charger contacts of the chargeable device, and also the chargeable device may not be in the active mode of operation. Specifically, when the user is not using the chargeable device, for example, simply placed the chargeable device on a table. In such instance, the chargeable device should change its mode of operation from the active mode of operation to the deep power saving mode of operation. For example, when the chargeable device is in the active mode of operation and still the at least one sensor fails to measure (or collect) sensor data, the processing circuitry may be configured to change mode of operation of the chargeable device from the active mode of operation to the deep power saving mode of operation.

In an embodiment, the processing circuitry may be configured to periodically detect the voltage level at the first point by periodically sending and detecting the measurement signal to and from the processing circuitry by the microcontroller. In an example, the measurement signal (of about 3 volts) may be sent periodically, for example in few seconds (or even in a minute), for continuously detecting (and monitoring) the voltage level at the first point and further change the mode of operation for the chargeable device accordingly.

According to an embodiment, the processing circuitry is also configured to perform a predetermined action when the voltage level detected at the first point is substantially different from the first voltage level value, the second voltage level value and the third voltage level value. The predetermined action may include reboot (or restart) the chargeable device. Specifically, the first, second and third voltage level values correspond to the charging, deep power saving and active mode of operations, respectively, and the chargeable device must essentially follow one of such modes of operations. Therefore, the processing circuitry is configured to reboot the chargeable device when the voltage level detected at the first point is substantially different from the first, second and third voltage level values.

In an embodiment, the charger may be a dummy charger (i.e. may not be operable for charging the chargeable device). As mentioned above, the charger of the present disclosure primarily includes the fourth resistor. Further, the charger includes the charger circuit for regulating electrical power there-through, however, the function of the charger circuit is not required when the chargeable device is packed in the sale package (until brought into use). Therefore, a dummy charger having only a resistor (such as the fourth resistor) may function equally well compared to the charger (having the charger circuit along with the resistor, explained herein above). Accordingly, the chargeable device of the present disclosure may be electrically coupled to the dummy charger (particularly, first and second contacts of the dummy charger) for allowing the chargeable device to operate in the deep power saving mode of operation, for example when packed in the sale package. Therefore, the dummy charger also enables in efficiently using electrical power of the battery of the chargeable device. It may be evident that the chargeable device may be used later in conjunction with the charger, explained herein above.

The present disclosure provides a system comprising a chargeable device and a charger for the chargeable device. The chargeable device essentially includes a battery integrally arranged within a body of the chargeable device (i.e. the battery is not accessible and operable from outside; however, the battery continuously operates from the installation time thereof). The chargeable device is cable of attaining various operational modes for efficiently utilizing the electrical energy of the battery. Specifically, the chargeable device is configured to attain the operational modes based on the electrical connection between the chargeable device and the charger, and whether or not the charger is energized. This enables in efficiently utilizing the electrical energy of the battery, i.e. saving battery power for longer battery life by avoiding unnecessary function of the chargeable device (i.e. the function of the sensor and the communication interface thereof). The chargeable device is also configured to switch (or change) operational modes for suitable and efficient operation thereof.

DETAILED DESCRIPTION OF THE DRAWINGS

Figure 1B:
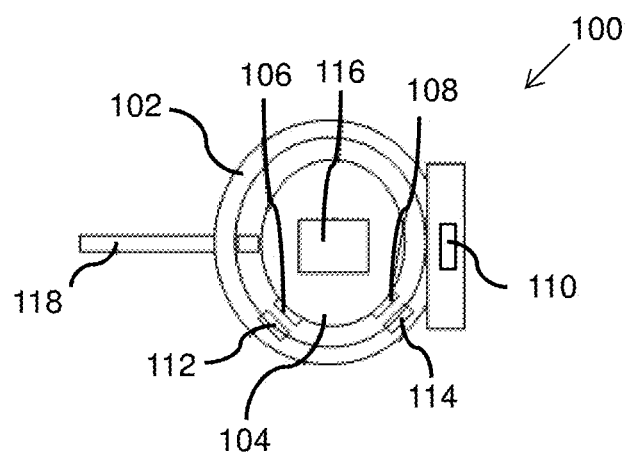

Referring to FIGS. 1A-B, illustrated are schematic illustrations of a system 100 having a chargeable device 102 and a charger 104 for the chargeable device 102, in accordance with an embodiment of the present disclosure. Specifically, FIG. 1A illustrates a side view of the chargeable device 102 and the charger 104 in an unengaged state (uncoupled), and FIG. 1B illustrates a top view of the chargeable device 102 and the charger 104 in an engaged state (coupled).

As shown, the chargeable device 102 has first and second charger contacts (i.e. electrical connector pads) 106 and 108 for electrically connecting the chargeable device 102 to the charger 104. Further, the chargeable device 100 comprises electronics 110. The electronics 110 comprises at least one sensor, a microcontroller, a battery, and a communication interface, shown in subsequent figures. Further, the charger 104 also includes first and second contacts (i.e. electrical connector pads) 112 and 114 for providing electricity to the chargeable device 102 via the first and second charger contacts 106, 108. The charger 104 also includes electronics 116 for controlling the charger 104 and providing adequate voltage levels to the chargeable device 102. The charger 104 is connected to a power source (such as household electrical supply) with a connector 118.

As shown in FIG. 1B, the chargeable device 102 is electrically connected (or engaged) with the charger 104 by inserting the chargeable device 102 into the charger 104, along a direction shown with an arrow (in the FIG. 1A). Further, when the chargeable device 102 is inserted into the charger 104, the first and second charger contacts 106, 108 of the chargeable device 102 are electrically connected to the first and second contacts 112, 114, respectively, of the charger 102.

Figure 2:
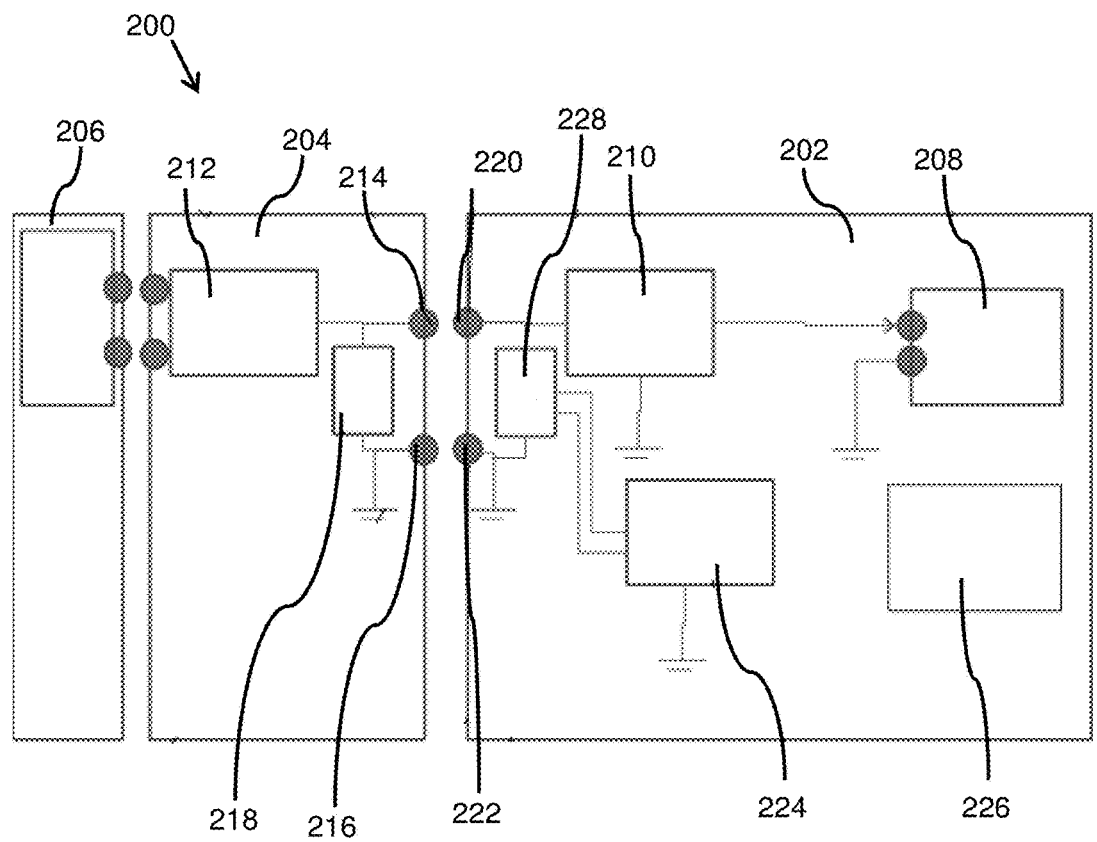
FIG. 2 is a schematic illustration of the system with details of the chargeable device and the charger, in accordance with an embodiment of the present disclosure.

Referring now to FIG. 2, illustrated is a schematic illustration of a system 200 (such as the system 100) with details of a chargeable device 202 and a charger 204 thereof, in accordance with an embodiment of the present disclosure. As shown the system 200 also includes a power source 206 for electrically charging the chargeable device 202 with the help of the charger 204. Specifically, the power source 206 provides electrical energy to the charger 204, for charging a battery 208 of the chargeable device 202 with the help of a charging circuit 210.

Figure 4:
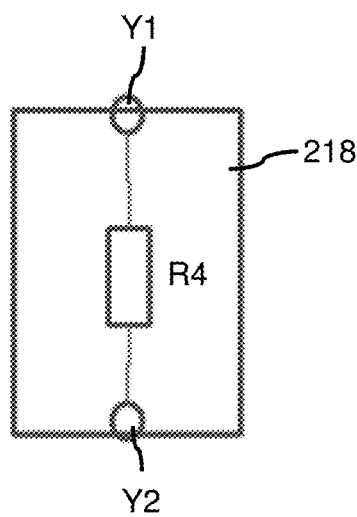
FIG. 4 is a schematic illustration of a circuit of the charger, in accordance with an embodiment of the present disclosure.

As shown, the charger 204 includes a charger circuitry 212, first and second contacts (i.e. connector pads) 214, 216 and a circuit 218 (explained in greater detail in conjunction with FIG. 4). The charger circuitry 212 enables in regulating electrical power from the power source 206 while charging the chargeable device 202. Further, the circuit 218 enables in detecting if the charger 204 is connected or unconnected to the chargeable device 202, whether or not the charger 204 is energized.

Further, as shown, the charger circuitry 210 of the chargeable device 202 can be connected to the charger 204 via first and second charger contacts (connector pads) 220 and 222. Specifically, the first contact 214 contacts the first charger contact 220, and the second contact 216 contacts the second charger contact 222. Moreover, the chargeable device 202 includes a microcontroller 224 for controlling various electronic components of the chargeable device 202. For example, the chargeable device 202 also includes electronic components 226, for having at least one sensor for collecting sensor data associated with a user and a communication interface for communicating the collected sensor data to an external device (not shown). The microcontroller 224 is operable to control the electronic components 226, i.e. the at least one sensor and the communication interface, with help of a processing circuitry 228. The microcontroller 224 can have (or process) analogue inputs and outputs. For example, the analogue inputs measure voltages in the processing circuitry 228 for controlling operations of the electronic components 226, which is explained in greater detail in conjunction with FIG. 3.

Figure 3:
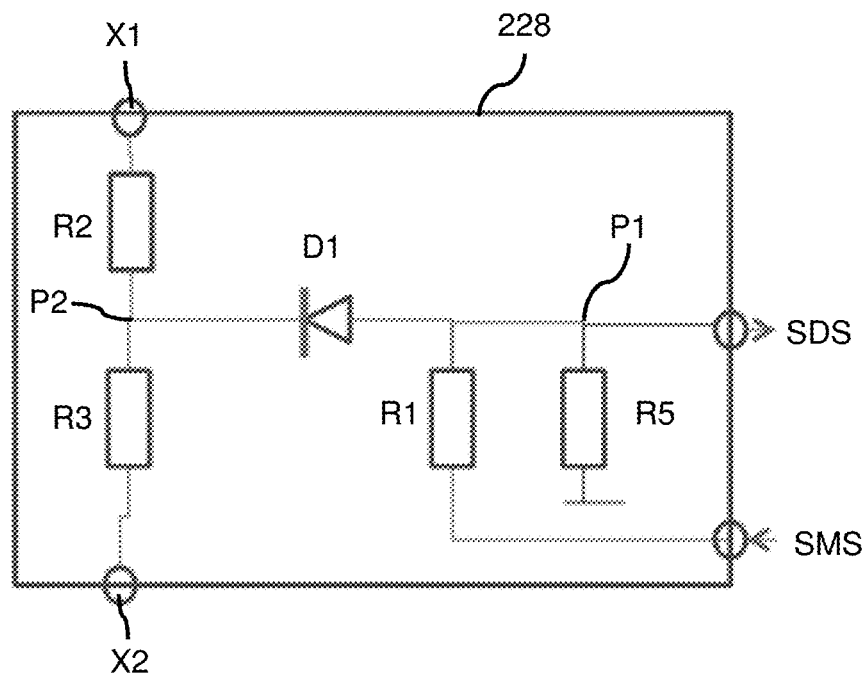
FIG. 3 is a schematic illustration of a processing circuitry of the chargeable device, in accordance with an embodiment of the present disclosure.

Referring now to FIG. 3, illustrated is a schematic illustration of the processing circuitry 228 of the chargeable device 202 (of FIG. 2), in accordance with an embodiment of the present disclosure. The processing circuitry 228 is configured to detect a voltage level at a first point P1. The first point P1 being electrically coupled via a first resistor R1 to a source of measurement signal SMS and via a diode D1 to a second point P2. The second point P2 being electrically coupled via a second resistor R2 to a first charger contact X1 of the chargeable device 202 (shown in FIG. 2) and via a third resistor R3 to a second charger contact X2 of the chargeable device 202. Also, shown is a fifth resistor R5 electrically coupled to the first point P1.

The processing circuitry 228 is configured to determine, from the voltage level detected at the first point P1, whether or not the first charger contact X1 and the second charger contact X2 of the chargeable device 202 are electrically connected to the charger 204 (shown in FIG. 2), and whether or not the charger 204 is energized. Further, the processing circuitry 228 is configured to select a mode of operation of the chargeable device 202, based upon the voltage level detected at the first point P1. The mode of operation of the chargeable device 202 is selected from the group consisting of a charging mode of operation, a deep power saving mode of operation, and an active mode of operation. Further, the processing circuitry 228 is configured to detect the voltage level at the first point P1 on a periodic basis. The voltage level at the first point P1 is measured with the help of a measurement signal (for example, a 3 volts measurement signal) to be provided by the microcontroller 224 (of FIG. 2) to the processing circuitry 228. For example, the measurement signal is provided at the source of measurement signal SMS and subsequently read at a source of detected signal SDS. The source of measurement signal SMS and the source of detected signal SDS are associated with the microcontroller 224 for providing the measurement signal and subsequently reading the detected signal (i.e. change in the voltage level at the first point P1, corresponding to the measurement signal, which is explained in greater detail with subsequent figures). As shown, an arrow coming into the processing circuitry 228 indicates the measurement signal provided at the source of measurement signal SMS by the microcontroller 224, and an arrow coming out from the processing circuitry 228 indicates the detected signal to be read at the source of detected signal SDS by the microcontroller 224.

Referring now to FIG. 4, illustrated is a schematic illustration of the circuit 218 of the charger 204 (shown in FIG. 2), in accordance with an embodiment of the present disclosure. As shown, the circuit 218 includes a first contact Y1 for electrically coupling to the first charger contact X1 of the chargeable device 202 (shown in FIG. 2) and a second contact Y2 for electrically coupling to the second charger contact X2 of the chargeable device 202. The circuit 218 also includes a fourth resistor R4 electrically coupled to the first contact Y1 and the second contact Y2.

Figure 5:
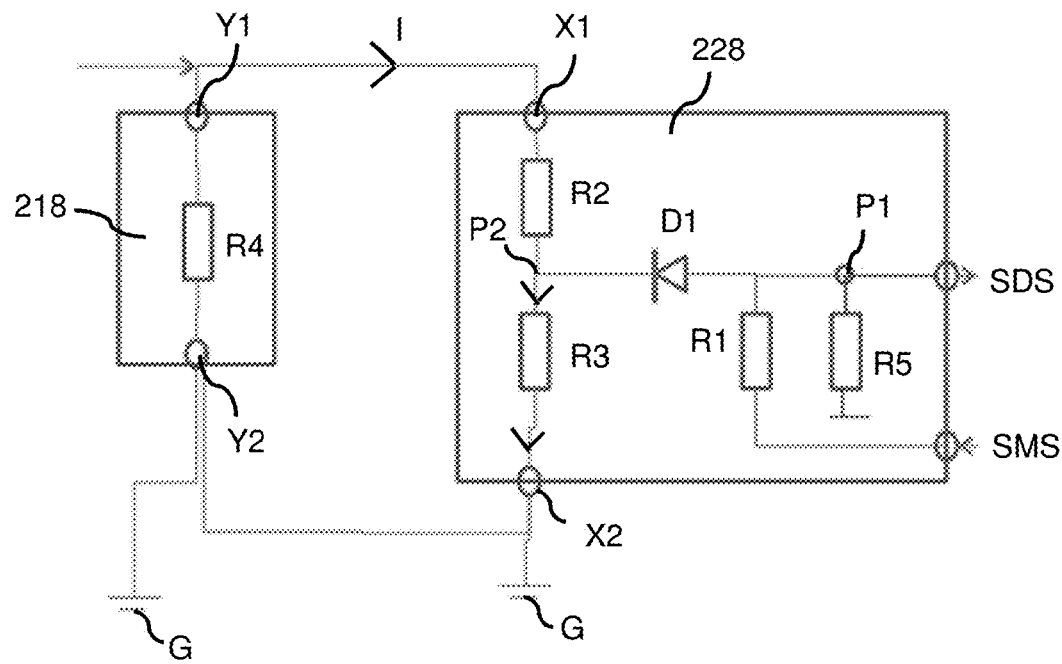
FIGS. 5-7 are schematic illustrations of the processing circuitry of the chargeable device and the circuit of the charger for detection of voltage levels at a first point of the processing circuitry of the chargeable device based on electrical connection between the chargeable device and the charger, and whether or not the charger is energized, in accordance with an embodiment of the present disclosure.
Figure 6:
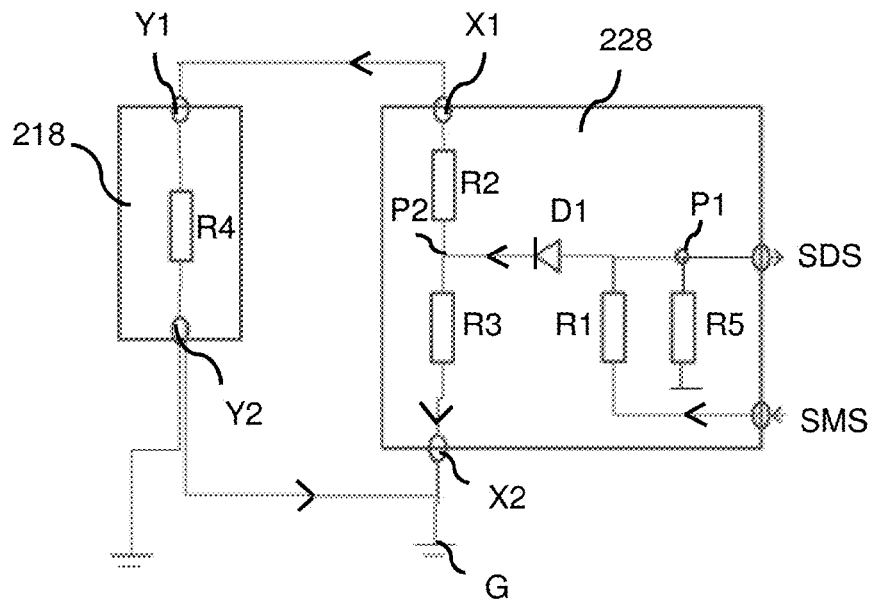
Figure 7:
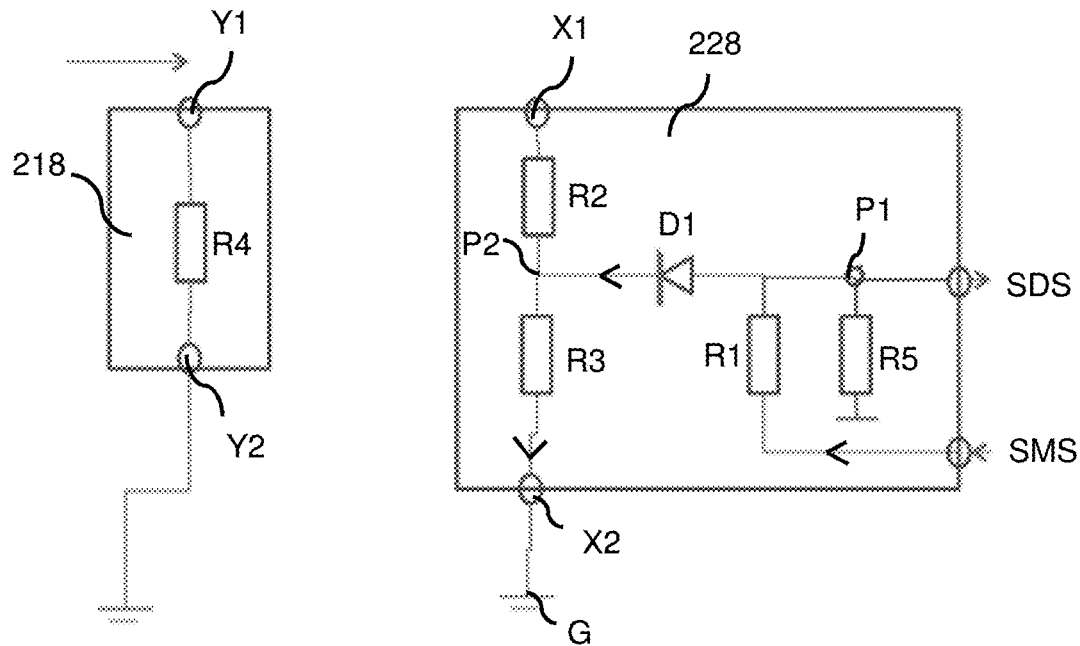

Referring now to FIGS. 5-7, illustrated are schematic illustrations of the processing circuitry 228 of the chargeable device 202 (shown in FIG. 2) and the circuit 218 of the charger 204 (shown in FIG. 2) for detection of voltage levels at the first point P1 of the processing circuitry 228 of the chargeable device 202 based on electrical connection between the chargeable device 202 and the charger 204, and whether or not the charger 204 is energized, in accordance with an embodiment of the present disclosure. In order to detect the various voltage levels at the first point P1 based on the measurement signal provided by the microcontroller 224, the components (such as R1, R2, R3, R5 and D1) of the processing circuitry 228 of the chargeable device 202 and the component (such as R5) of the circuit 218 of the charger 204 are configured to have specific values.

For illustration purposes only, there will now be considered example values for the components (such as R1, R2, R3, R4, R5 and D1) in order to detect the various voltage levels at the first point P1 pursuant to embodiments of the present disclosure. The components may be configured to have following values:

First resistor R1=1000 ohms
Second resistor R2=120 ohms
Third resistor R3=2200 ohms
Fourth resistor R4=4700 ohms
Fifth resistor R5=330 k ohms
Diode D1 is configured to provide a voltage drop thereacross of about 0.25 V.

Referring now to FIG. 5, illustrated is a schematic illustration for detection of a first voltage level value at the first point P1, when the charger 204 (shown in FIG. 2) is electrically connected to the chargeable device 202 (shown in FIG. 2), and the charger 204 is energized. As shown, the first contact Y1 of the charger 204 is electrically connected to the first charger contact X1 of the processing circuitry 228 and the second contact Y2 of the charger 204 is electrically connected to the second charger contact X2 of the processing circuitry 228, and the charger 204 is energized. In the present embodiment, the charger 204 is energized with the application of a charging voltage of about 5 volts across the first and second contacts Y1 and Y2. In such instance, the current I passes from the first contact Y1 to the first charger contact X1, then to the second point P2 via the second resistor R2, then to the second charger contact X2 via the third resistor R3 and then finally to a ground point G. Also, the current I would pass from the first contact Y1 to the second contact Y2 via the fourth resistor R4 and then finally to the ground point G.

Therefore, the current I may be determined using following equation:

$$5-I*R2-I*R3=0$$

$$I=5/(R2+R3)$$

Further, a voltage level value at the second point P2 (hereinafter denoted as VP2) is determined using following equation:

$$VP2=5-I*R2$$

$$VP2=5-(5*R2)/(R2+R3)$$

$$VP2=5*(R3/(R2+R3))$$

$$VP2=5*(2200/(120+2200))$$

$$VP2=4.7 \text{ volts}$$

Also, the source of measurement signal SMS provides the measurement signal of 3 volts, since, the voltage level at cathode of the diode D1 is higher than the voltage level at its anode, thus the diode D1 herein is reverse biased. Accordingly, no current flows through the diode D1. This causes the first voltage level value (when the charger 204 is electrically connected to the chargeable device 202, and the charger 204 is energized) detected at the first point P1 (hereinafter denoted as VP1) of the processing circuitry 228 is equal to 3 volts (i.e. the voltage provided by the source of measurement signal SMS). In other words, the detected signal that would be subsequently read at the source of detected signal SDS (for the microcontroller 224) would be 3 volts. The resistors R1 and R5 may also form a voltage dividing pair, such that $$VP1=R5/(R5+R1)*SMS$$

In case of R5>>R1, then VP1 is approximately equal to SMS

Further, in such instance, the processing circuitry 228 is configured to select a mode of operation for the chargeable device 202, based upon the detected first voltage level value (of about 3 volts) at the first point P1. Specifically, based on the detected first voltage level value (of about 3 volts) at the first point P1 the processing circuitry 228 is configured to select a charging mode of operation for the chargeable device 202. In the charging mode of operation the communication interface of the chargeable device 202 is energized, which enables in establishing a communication between the chargeable device 202 and an external device (not shown).

Referring now to FIG. 6, illustrated is a schematic illustration of detection of a second voltage level value at the first point P1, when the charger 204 (shown in FIG. 2) is electrically connected to the chargeable device 202 (shown in FIG. 2), and the charger 204 is un-energized. As shown, the first contact Y1 of the circuit 218 is electrically connected to the first charger contact X1 of the processing circuitry 228 and the second contact Y2 of the circuit 218 is electrically connected to the second charger contact X2 of the processing circuitry 228. Further, the charger 204 is un-energized (no charging voltage is provided by the charger 204 to the processing circuitry 228 of the chargeable device 202. In such instance, when the source of measurement signal SMS sends the measurement signal of about 3 volts, the current I pass through the circuit 218 and the processing circuitry 228. As shown, the current I pass from the source of measurement signal SMS to the second point P2 through the first resistor R1 and the diode D1, and then finally to the ground point G through the third resistor R3, the second resistor R2, the fourth resistor R4 and the second charger contact X2. Further, in such instance the diode D1 is forward biased, and allows the current I to pass through the fourth resistor R4, as voltage at the anode side (i.e. about the first point P1) of the diode D1 is more than the voltage at the cathode side (i.e. about the second point P2) of the diode D1.

Therefore, the current I may be determined using following equation:

$$3-1*R1-VD-I((R4+R2)*R3/R4+R2+R3)=0$$

$$3-1*R1-VD4((4700+120)*2200/4700+120+2200)=0$$

$$3-I*R1-VD-I*1510=0$$

$$I=(3-VD)/(R1+1510)$$

Where, VD means voltage of the diode D1, which is equal to 0.25 Volts

Further, the voltage level VP1 (i.e. the second voltage level value) at the first point P1 is determined using following equation:

$$VP1-VD-I*1510=0$$

$$VP1=VD+I*1510$$

$$VP1=VD+((3-VD)/(R1+1510))*1510$$

$$VP1=0.25+((3-0.25)/(1000+1510))*1510$$

$$VP1=1.9 \text{ volts}$$

This causes the second voltage level value detected (when the charger 204 is electrically connected to the chargeable device 202, and the charger 204 is un-energized) at the first point P1 of the processing circuitry 228 is equal to 1.9 volts (i.e. VP1). In other words, the detected signal that would be subsequently read at the source of detected signal SDS (for the microcontroller 224) would be 1.9 volts. Further, in this case the effect of R5 is minor and can be neglected.

Further, in such instance, the processing circuitry 228 is configured to select a mode of operation for the chargeable device 202, based upon the detected second voltage level value (of about 1.9 volts) at the first point P1. Specifically, based on the detected second voltage level value (of about 1.9 volts) at the first point P1 the processing circuitry 228 is configured to select a deep power saving mode of operation for the chargeable device 202. In the deep power saving mode of operation, the at least one sensor and the communication interface of the chargeable device 202 are de-energized, which enables in saving battery power for longer battery life, and avoids unnecessary function of the chargeable device 202 (i.e. the sensor and the communication interface thereof. The processing circuitry 228 is also configured to check periodically whether the charger 204 is still electrically connected to the first charger contact X1 and to the second charger contact X2 of the chargeable device 202 and the charger 204 is un-energized, when the chargeable device 202 is in the deep power saving mode of operation. This allows in switching the mode of operations for the chargeable device 202, for example, from the deep power saving mode of operation to the charging mode of operation or an active mode of operation (which is explained in conjunction with FIG. 7).

Referring now to FIG. 7, illustrated is a schematic illustration of detection of a third voltage level value at the first point P1, when the charger 204 (shown in FIG. 2) is electrically unconnected to the chargeable device 202 (shown in FIG. 2). As, charger 204 is electrically unconnected to the chargeable device 202, no charging voltage is provided by the charger 204 to the processing circuitry 228 of the chargeable device 202. In such instance, when the source of measurement signal SMS sends the measurement signal of about 3 volts, the current I pass through the processing circuitry 228. The current I pass from the source of measurement signal SMS to the second point P2 through the first resistor R1 and the diode D1, and then finally to the ground point G through the third resistor R3 and the second charger contact X2.

Therefore, the current I may be determined using following equation:

$$3-I*R1-VD-I*R3=0$$

$$I=(3-VD)/(R1+R3)$$

Further, the voltage level VP1 (i.e. the third voltage level value) at the first point P1 is determined using following equation:

$$VP1-VD-I*R3=0$$

$$VP1=VD+I*R3$$

$$VP1=VD+((3-VD)/(R1+R3))*R3$$

$$VP1=0.25+(2.75*2200)/3200$$

$$VP1=2.1 \text{ volts}$$

This causes the third voltage level value detected (when the charger 204 is electrically unconnected to the chargeable device 202) at the first point P1 of the processing circuitry 228 is equal to 2.1 volts (i.e. VP1). In other words, the detected signal that would be subsequently read at the source of detected signal SDS (for the microcontroller 224) would be 2.1 volts.

Further, in such instance, the processing circuitry 228 is configured to select a mode of operation for the chargeable device 202, based upon the detected second voltage level value (of about 2.1 volts) at the first point P1. Specifically, based on the detected second voltage level value (of about 2.1 volts) at the first point P1 of the processing circuitry 228 is configured to select the active mode of operation for the chargeable device 202. In the active mode of operation, the at least one sensor of the chargeable device 202 is energized, which enables in collecting sensor data associated with the user. Further, in the active mode of operation, the communication interface of the chargeable device 202 is also energized.

The processing circuitry 228 is also configured to perform a predetermined action when the voltage level value detected at the first point P1 is substantially different from the first voltage level value (for example 3 Volts), the second voltage level value (for example 1.9 Volts) and the third voltage level value (for example 2.1 Volts). The predetermined action includes reboot (or restart) the chargeable device 202.

Figure 8:
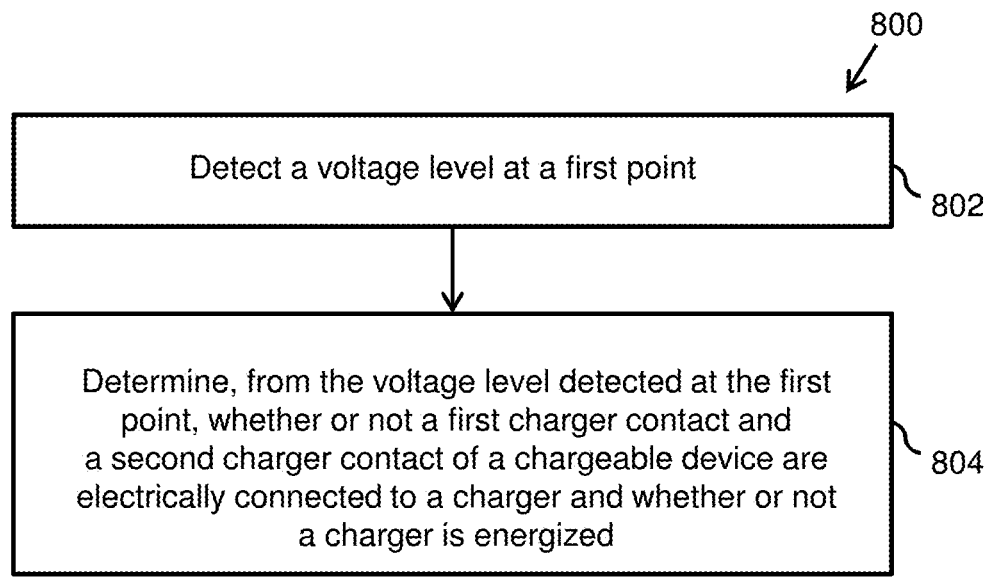
FIG. 8 is an illustration of steps of a method for use with a chargeable device, in accordance with an embodiment of the present disclosure.

Referring now to FIG. 8, illustrated are steps of a method 800 for use with a chargeable device (such as the chargeable device 202 of FIG. 2), in accordance with an embodiment of the present disclosure. Specifically, the method 800 relates to the use of the chargeable device (such as the chargeable device 102 and 202 explained in conjunction with FIG. 1-7).

At step 802, a voltage level is detected at a first point. The first point being electrically coupled via a first resistor to a source of measurement signal and via a diode to a second point. The second point being electrically coupled via a second resistor to a first charger contact of the chargeable device and via a third resistor to a second charger contact of the chargeable device.

At step 804, determine, from the voltage level detected at the first point, whether or not the first charger contact and the second charger contact of the chargeable device are electrically connected to a charger and whether or not the charger is energized.

Figure 9:
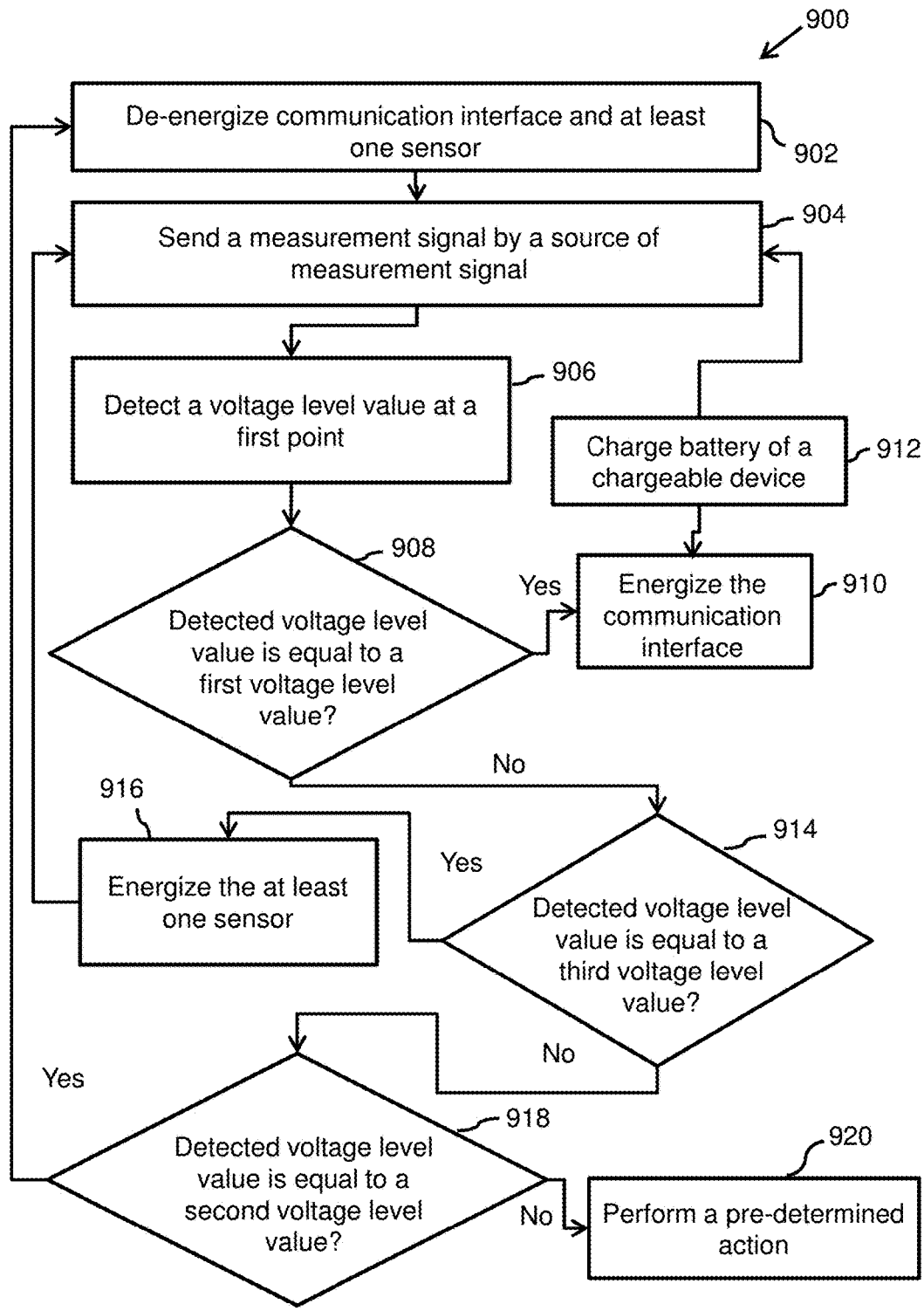
FIG. 9 is a flow chart depicting the steps of the method of FIG. 8 in detail, in accordance with an embodiment of the present disclosure.

Further, based on the various detected voltage level values at the first point, the chargeable device may be configured to attain different operational modes, which is explained in greater detail in conjunction with FIG. 9.

Referring now to FIG. 9, illustrated is a flow chart 900 depicting the steps of the method of FIG. 8 in detail, in accordance with an embodiment of the present disclosure.

At step 902, a communication interface and at least one sensor of the chargeable device are de-energized.

At step 904, a measurement signal (for example of about 3 volts) is send by a source of measurement signal (associated with a microcontroller of the chargeable device.

At step 906, a voltage level value (i.e. VP1) at the first point (i.e. P1) of the processing circuitry is detected.

At step 908, it is checked if the detected voltage level value (i.e. VP1) is equal to the first voltage level value (for example 3 volts). Further, if the detected voltage level value is equal to the first voltage level value, the communication interface is energized at step 910. Further, at step 912, the battery of the chargeable device is charged. The step 904 is performed subsequent to the step 912.

Furthermore, if the detected voltage level value is not equal to the first voltage level value, then at step 914, it is checked if the detected voltage level value is equal to the third voltage level value (for example 2.1 volts). If the detected voltage level value is equal to the third voltage level value, then at step 916, the at least one sensor is energized. The step 904 is performed subsequent to the step 916.

Moreover, if the detected voltage level value is not equal to the third voltage level value, then at step 918, it is checked if the detected voltage level value is equal to the second voltage level value (for example 1.9 volts). If the detected voltage level value is equal to the second voltage level value, then step 902 is performed. Otherwise, if the detected voltage level value is not equal to the second voltage level value, then at step 920, a predetermined action is performed.

Therefore, the flow chart 900 illustrates various detected voltage level values (such as the first, second and third voltage level values) at the first point of the processing circuitry, and accordingly allow the chargeable device to attain different operational modes (i.e. a charging mode of operation, a deep power saving mode of operation, and an active mode of operation, respectively).

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A chargeable device comprising:
    a processing circuitry configured to detect a voltage level at a first point (P1), the first point (P1) being electrically coupled via a first resistor (R1) to a source of measurement signal and via a diode to a second point (P2), the second point (P2) being electrically coupled via a second resistor (R2) to a first charger contact (X1) of the chargeable device and via a third resistor (R3) to a second charger contact (X2) of the chargeable device,
    wherein the processing circuitry is configured to determine, from the voltage level detected at the first point (P1), whether or not the first charger contact (X1) and the second charger contact (X2) of the chargeable device are electrically connected to a charger and whether or not the charger is energized; and
    wherein the first resistor (R1), the second resistor (R2) and the third resistor (R3) are arranged to have resistance values in a manner that the voltage level detected at the first point (P1) is substantially equal to:
        (i) a first voltage level value, when a charger is electrically connected to the first charger contact (X1) and to the second charger contact (X2) of the chargeable device and the charger is energized,
        (ii) a second voltage level value, when the charger is electrically connected to the first charger contact (X1) and to the second charger contact (X2) of the chargeable device and the charger is unenergized, and
        (iii) a third voltage level value, when the charger is electrically unconnected to at least one of the first charger contact (X1) and the second charger contact (X2) of the chargeable device.

2. The chargeable device according to claim 1, wherein the processing circuitry is configured to perform a predetermined action when the voltage level detected at the first point (P2) is substantially different from the first voltage level value, the second voltage level value and the third voltage level value.

3. The chargeable device according to claim 1, wherein the processing circuitry is configured to select a mode of operation of the chargeable device, based upon the voltage level detected at the first point (P2), wherein the mode of operation of the chargeable device is selected from the group consisting of
    active mode of operation, wherein the device is absent from the charger,
    deep power saving mode of operation, wherein the device is in the charger and the charger is un-energized, and
    charging mode of operation, wherein the device is in the charger and the charger is energized.

4. The chargeable device according to claim 3, wherein the chargeable device further comprises:
    at least one sensor for collecting sensor data; and
    a communication interface for communicating the collected sensor data to an external device, wherein the processing circuitry is configured to:
        (a) energize the at least one sensor and the communication interface, when the chargeable device is in the active mode of operation;
        (b) energize the at least one sensor, when the chargeable device is in the charging mode of operation; and
        (c) de-energize the at least one sensor and the communication interface, when the chargeable device is in the deep power saving mode of operation.

5. The chargeable device according to claim 1, wherein the processing circuitry is configured to detect the voltage level at the first point (P1) on a periodic basis.

6. The chargeable device according to claim 5, wherein the processing circuitry is configured to check periodically whether the charger is still electrically connected to the first charger contact (X1) and to the second charger contact (X2) of the chargeable device and the charger is unenergized, when the chargeable device is in a deep power saving mode of operation.

7. The charger for use with a chargeable device, the charger comprising:
    a first contact (Y1) for electrically coupling to the first charger contact (X1) of the chargeable device;
    a second contact (Y2) for electrically coupling to the second charger contact (X2) of the chargeable device; and
    a fourth resistor (R4) electrically coupled to the first contact (Y1) and to the second contact (Y2); and
    wherein the chargeable device comprises:
    processing circuitry configured to detect a voltage level at a first point (P1), the first point (P1) being electrically coupled via a first resistor (R1) to a source of measurement signal and via a diode to a second point (P2), the second point (P2) being electrically coupled via a second resistor (R2) to a first charger contact (X1) of the chargeable device and via a third resistor (R3) to a second charger contact (X2) of the chargeable device,
    wherein the processing circuitry is configured to determine, from the voltage level detected at the first point (P1), whether or not the first charger contact (X1) and the second charger contact (X2) of the chargeable device are electrically connected to a charger and whether or not the charger is energized; and
    wherein the first resistor (R1), the second resistor (R2) and the third resistor (R3) are arranged to have resistance values in a manner that the voltage level detected at the first point (P1) is substantially equal to:
        (i) a first voltage level value, when a charger is electrically connected to the first charger contact (X1) and to the second charger contact (X2) of the chargeable device and the charger is energized,
        (ii) a second voltage level value, when the charger is electrically connected to the first charger contact (X1) and to the second charger contact (X2) of the chargeable device and the charger is unenergized, and
        (iii) a third voltage level value, when the charger is electrically unconnected to at least one of the first charger contact (X1) and the second charger contact (X2) of the chargeable device.

8. The charger according to claim 7, wherein the charger is a dummy charger.

9. The charger according to claim 7, wherein the resistance of the resistors is selected such that
    the resistance of R1 is from 500 to 10000 ohm,
    the resistance of R2 is 0.1 to 0.3 times the resistance of R1,
    the resistance of R3 is 1.5 to 3 times the resistance of R1,
    the resistance of R4 is 1.5 to 3 times the resistance of R3.

10. The system comprising a chargeable device according to claim 1 and a charger according to claim 7.

11. A method for use with a chargeable device, the method comprising:
   detecting a voltage level at a first point (P1), the first point (P1) being electrically coupled via a first resistor (R1) to a source of measurement signal and via a diode to a second point (P2), the second point (P2) being electrically coupled via a second resistor (R2) to a first charger contact (X1) of the chargeable device and via a third resistor (R3) to a second charger contact (X2) of the chargeable device;
   determining, from the voltage level detected at the first point (P1), whether or not the first charger contact (X1) and the second charger contact (X2) of the chargeable device are electrically connected to a charger and whether or not the charger is energized; and
   wherein the method further comprises arranging for the first resistor (R1), the second resistor (R2) and the third resistor (R3) to have resistance values in a manner that the voltage level detected at the first point (P1) is substantially equal to:
   (i) a first voltage level value, when the charger is electrically connected to the first charger contact (X1) and to the second charger contact (X2) of the chargeable device and the charger is energized,
   (ii) a second voltage level value, when the charger is electrically connected to the first charger contact (X1) and to the second charger contact (X2) of the chargeable device and the charger is unenergized, and
   (iii) a third voltage level value, when the charger is electrically unconnected to at least one of the first charger contact (X1) and the second charger contact (X2) of the chargeable device.

12. The method according to claim 11, wherein the method further comprises performing a predetermined action when the voltage level detected at the first point (P1) is substantially different from the first voltage level value, the second voltage level value and the third voltage level value.

13. The method according to claim 11, wherein the method further comprises selecting a mode of operation of the chargeable device, based upon the voltage level detected at the first point (P1), wherein the mode of operation of the chargeable device is selected from the group consisting of an active mode of operation, a charging mode of operation, and a deep power saving mode of operation.

14. The method according to claim 13, wherein the method further comprises:
   energizing at least one sensor and a communication interface of the chargeable device, when the chargeable device is in the active mode of operation;
   energizing the at least one sensor, when the chargeable device is in the sleep mode of operation; and
   de-energizing the at least one sensor and the communication interface, when the chargeable device is in the deep power saving mode of operation.

15. The method according to claim 11, wherein the method further comprises detecting the voltage level at the first point (P1) on a periodic basis.

16. The method according to claim 15, wherein the method further comprises checking periodically whether the charger is still electrically connected to the first charger contact (X1) and to the second charger contact (X2) of the chargeable device and the charger is unenergized, when the chargeable device is in a deep power saving mode of operation.

* * * * *